United States Patent [19]
Sadr

[11] Patent Number: 6,053,215
[45] Date of Patent: Apr. 25, 2000

[54] AIR CONDITIONING DUCT AND METHOD OF MAKING

[75] Inventor: Changize Sadr, North York, Canada

[73] Assignee: Salflex Polymers Ltd., Weston, Calif.

[21] Appl. No.: 09/080,354

[22] Filed: May 18, 1998

[51] Int. Cl.⁷ ..................................................... F16L 9/12
[52] U.S. Cl. ..................... 138/178; 138/DIG. 4
[58] Field of Search ................ 138/32, 178, DIG. 4; 454/82, 85, 93, 121

[56] References Cited

U.S. PATENT DOCUMENTS

| | | | |
|---|---|---|---|
| 2,089,492 | 8/1937 | Lambert | 138/DIG. 4 |
| 3,823,745 | 7/1974 | Schafenacker, Jr. | 138/125 |
| 5,399,073 | 3/1995 | Bauer | 454/82 |
| 5,906,952 | 5/1999 | Everaere et al. | 454/82 |

*Primary Examiner*—James Hook
*Attorney, Agent, or Firm*—Bereskin & Parr

[57] ABSTRACT

An air conditioning duct for use in confined spaces such as the instrument panel of an automobile. To eliminate dripping from condensation formed from warm ambient air, the duct is coated with a superabsorbent material which absorbs condensation and promotes evaporation thereby retarding dripping from the conduit for an extended period of several hours. The superabsorbent material may be adhered to the duct by an adhesive or molded in situ in a blow molding process.

12 Claims, 7 Drawing Sheets

FIG. 10

CONDUIT TESTED

| No. | Conduit Description | Material Absorption per 1 gm water | Inner Conduit Temperature C | Outer Conduit Temperature C | Air Flow Velocity CFM | Outer Conduit Humidity % | Saturation Time (minute) | Bead Time (minute) | Drip Time (minute) | Evaporation Rate (gms/minute) |
|---|---|---|---|---|---|---|---|---|---|---|
| | (1) | (2) | (3) | (4) | (5) | (6) | (7) | (8) | (9) | (10) |
| 1 | Basic Conduit | N/A | 0.4 | 38 | 50 | 98 | 3 | 4 | 8 to 12 | N/A |
| 2 | Conduit with full sleeve | 5.4 | 0.4 | 38 | 50 | 98 | 30 | 60 | 55 to 90 | 0.20 |
| 3 | Conduit with half sleeve | 5.4 | 0.4 | 38 | 50 | 98 | 15 | 20 | 30 to 40 | 0.20 |
| 4 | Conduit with full layer collector | 40 | 0.4 | 38 | 50 | 98 | 180 | 200 | 300 to 350 | 0.23 |
| 5 | Conduit with half layer collector | 40 | 0.4 | 38 | 50 | 98 | 20 | 30 | 160 to 180 | 0.23 |
| 6 | Conduit with full sleeve/nylon | | 0.4 | 38 | 50 | 98 | 25 | 45 | 60 to 75 | 0.20 |
| 7 | Conduit TPO | | 0.2 | 38.1 | 50 | 98 | 3 | 5 | 8 to 10 | |
| 8 | Foam TPO Conduit | | 0.00 | 38 | 51 | 98 | 4 | 8 | 10 to 11 | |
| 9 | LDPE Conduit | | 3.5 | 38 | 51 | 98 | 8 | 17 | 20 to 25 | |
| 10 | Foam Conduit | | 3.4 | 38.1 | 51 | 98 | 5 | 10 | 35 to 40 | |
| 11 | Foam PP/Conduit | | 0.2 | 38.1 | 51 | 98 | 3 | 5 | 7 to 9 | |
| 12 | Conduit with half collector and full sleeve | | 0.6 | 38.1 | 50 | 98 | 120 | 150 | 220 to 240 | 0.17 to 25 |

6,053,215

AIR CONDITIONING DUCT AND METHOD OF MAKING

FIELD OF THE INVENTION

This invention relates to automobile air conditioning systems, and more particularly to an improved apparatus for and method of reducing dripping of condensation moisture from components of such systems.

BACKGROUND OF THE INVENTION

Cooled air passing through a conduit commonly used in automobile air condition systems will cool the outer surfaces of the conduit such that condensation forms on these outer surfaces. Over a period of time of continued use, sufficient condensation forms on the outer surface of the conduit so that moisture begins to drip from the conduit. Typically, automotive air conditioning systems make use of one or more conduits which are located within the instrument panel of the automobile, and which may be adjacent electronic components such as audio components, air bag sensors, and the like. Obviously, moisture coming into contact with such electronic components may be detrimental to their proper operation, and thus it is desirable to take steps to reduce or eliminate the chance of moisture making such contact. It has been observed that in normal operation, the outer surfaces of the conduits of an air conditioning of a typical automotive air conditioning system can begin to drip condensation moisture within 5 to 10 minutes of operation in typical weather conditions in which cooling of the automobile interior is desired.

One approach to the problem of moisture dripping from such conduits in operation has been to soak up or absorb condensation moisture as it occurs on the outer surface of the conduit. Early attempts to do this are accomplished by providing a nylon sleeve around the exterior surface of the conduit to absorb condensed water. This solution is not satisfactory as the sleeve becomes quickly saturated with condensation moisture and, thus, offers only a short time of air conditioner operation before moisture again begins to drip from the conduit.

Accordingly, there is a need for an improved system for dealing with condensation moisture which collects on conduit surfaces.

SUMMARY OF THE INVENTION

In one aspect, the present invention provides an improved conduit assembly for use in an automobile air conditioning system, the conduit assembly comprising:

a conduit capable of allowing air to pass therealong, the conduit having an exterior surface; and a super absorbent fabric material containing super absorbent fibers wherein the superabsorbent fabric material is positioned adjacent the exterior surface of said conduit for collecting condensation moisture forming on the exterior surface of said conduit when cooled air is passed through said conduit.

In a second aspect, the present invention provides a method of fabricating a conduit for use in an automobile air conditioning system, the conduit having a superabsorbent fabric material adhered to at least a portion of an exterior surface thereof, comprising the steps of:

providing a partible mold for blow molding the conduit, said mold having an interior molding surface;

placing the superabsorbent fabric material adjacent at least a portion of the interior surface of the mold;

extruding a parison of a blow moldable thermoplastic material within said mold;

closing said mold; and applying a blow moulding gas under pressure to the interior of the parison so that said parison is shaped by said mould and so that said air conditioning conduit is formed having the superabsorbent fabric material integrally adhered to at least a portion of an exterior surface of said conduit.

BRIEF DESCRIPTION OF THE DRAWINGS

For a better understanding of the present invention, and to show more clearly how it may be carried into effect, reference will now be made by way of example to the accompanying drawings.

The drawings show preferred embodiments of the present invention, in which:

FIG. 10 is a bar chart illustrating the performance of certain comparison tests of prior art and with various embodiments of the invention.

DETAILED DESCRIPTION OF THE PREFERRED EMBODIMENT

Figure 1:
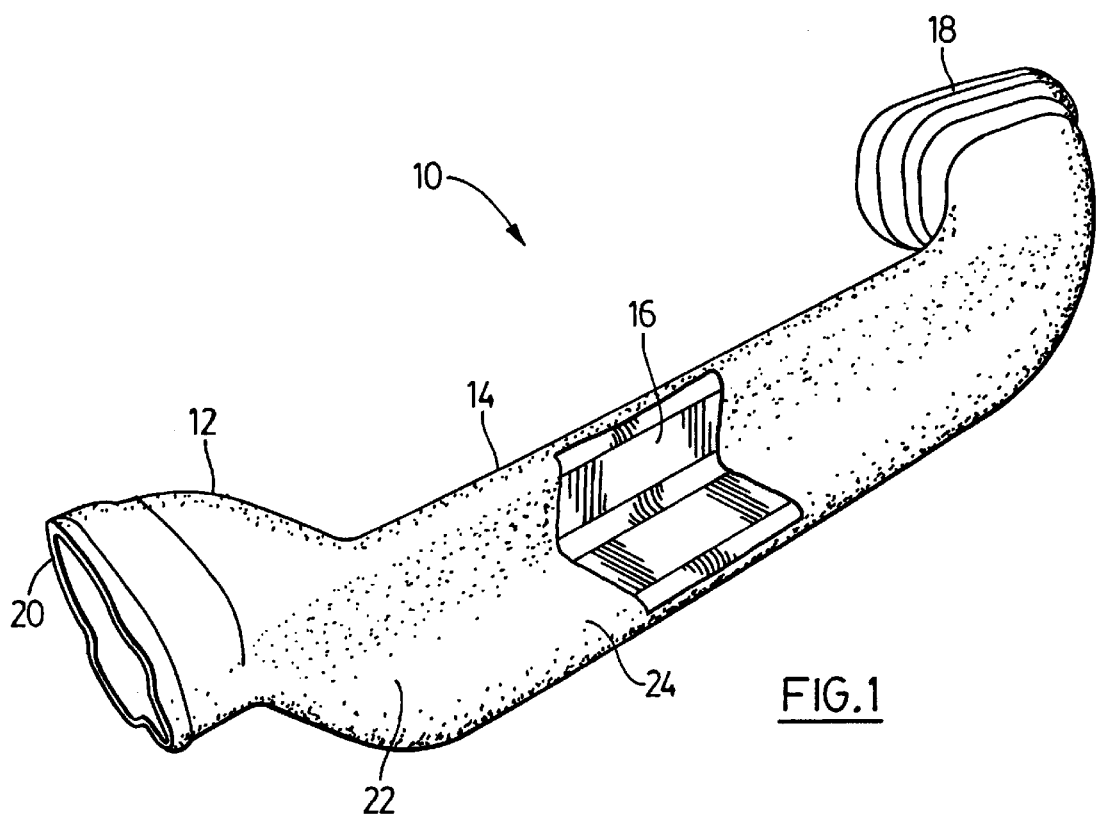
FIG. 1 is a perspective view of a conduit according to the present invention, with a portion thereof broken away for illustration purposes.

Referring to FIG. 1, an automotive air conditioning conduit assembly according to the present invention is shown generally at 10. Conduit assembly 10 has a conduit 12, a duct 14, an exterior surface 16, an inlet 18 and an outlet 20. Conduit 12 constitutes a closed passageway from inlet 18 to outlet 20 such that, when conduit assembly 10 is installed in a typical automotive air conditioning system (not shown), conduit assembly 10 can establish air flow communication along the conduit 12 between an air conditioner and an instrument panel vent connected to inlet 18 and outlet 20, respectively. When so connected, and the air conditioning system is in operation, cooled air passes along conduit 12. As will be recognized by those familiar with designing layouts of automotive instrument panels, space is very much at a premium given the number of components which are mounted in the instrument panel. The shape of the duct may be very complicated in order to meet the requirements of providing suitable air flow, while at same time providing clearance for items such as electrical instruments, radios, HVAC controls, storage compartments and the like. Because of the complicated configuration required, the conduit comprising the duct, inlet and outlet may advantageously made using blow moulding techniques. The conduit 12 is preferably blow molded using a suitable polymeric material, such as polyethylene, SALFLEX™ (a trade mark of Salflex Polymers Ltd.), T.P.O., HYTREL™ (a trade mark of E.I. Du Pont De Nemours & Company), or the like.

To collect condensation, the conduit assembly 10 includes a collector 22. The collector 22 has an outer surface 24 which is in contact with ambient air surrounding conduit 12. In the embodiment, illustrated in FIG. 1, collector 22 completely covers exterior surface 16 of the conduit 12. In this specification the term fiber is used to refer to a thin, cylindrical cross section shaped article when the ratio of length to diameter is at least five. The term "superabsorbent" in association with the world fiber is used to refer to a fiber made of absorbent material capable of absorbing at least ten (10) times its own weight in a test liquid. The term superabsorbent fabric material is used to refer to a fabric made from superabsorbent fibers or form superabsorbent fibers and other fibers.

Collector 22 is constructed from one or more layers of sheet-like composite material herein referred to as a superabsorbent fabric material. The superabsorbent fabric material preferably has a strong potential in absorbency of water. It has been found that superabsorbent fibers (SAF) such as FIBERDRI™ (a trademark of Camelot Super Absorbents Ltd.), a fiber comprising inorganic salts of olefin/alkyl carboxylate copolymer, are well-suited for use in making the collector 22. The FIBERDRI™ fibers are referred to as 1161¼ where the first number represents product grade and the second number represents fiber length. The collector 22 is a composite and is preferably made from a blend of SAF and polymeric fibers. The polymeric fibers may be made from polyethylene polypropylene and the like. The SAF and the polymeric fibers are blended, entangled and bound by the needle punch technique, then compressed into a layer. In particular, it has been discovered that a collector 22 composed of a blend of 60% polymeric fibers by weight and 40% SAF by weight and having a weight distribution of 115 grams per square meter and a thickness of about 1.0 to about 1.5 mm has particularly advantageous properties in the collection of condensation moisture on air conditioning conduits.

Primarily, use of such composite materials allows a significantly improved amount of condensation to be absorbed before saturation of the material occurs. Surprisingly, however, it has been found that such materials also have good evaporative characteristics which may be advantageously utilized in conjunction with conduit 12, as will be described in more detail below.

Collector 22 may be affixed in a number of ways to exterior surface 16. In one embodiment, it may simply be adhered to exterior surface 16 with the use of a suitable adhesive such as contact cement (which may be either sprayable or brushable). In the preferred embodiment however, collector 22 is integrally adhered to exterior surface 16 by placing the collector fabric in the interior of the mold prior to blow molding as will be described below. In this way, the need for separate adhesion of collector 22 is eliminated.

The steps which may be employed to integrally adhere collector 22 to conduit 12 are shown diagrammatically in FIGS. 2 through 5. Conduit 12 is formed in a blow molding process.

Figure 2:
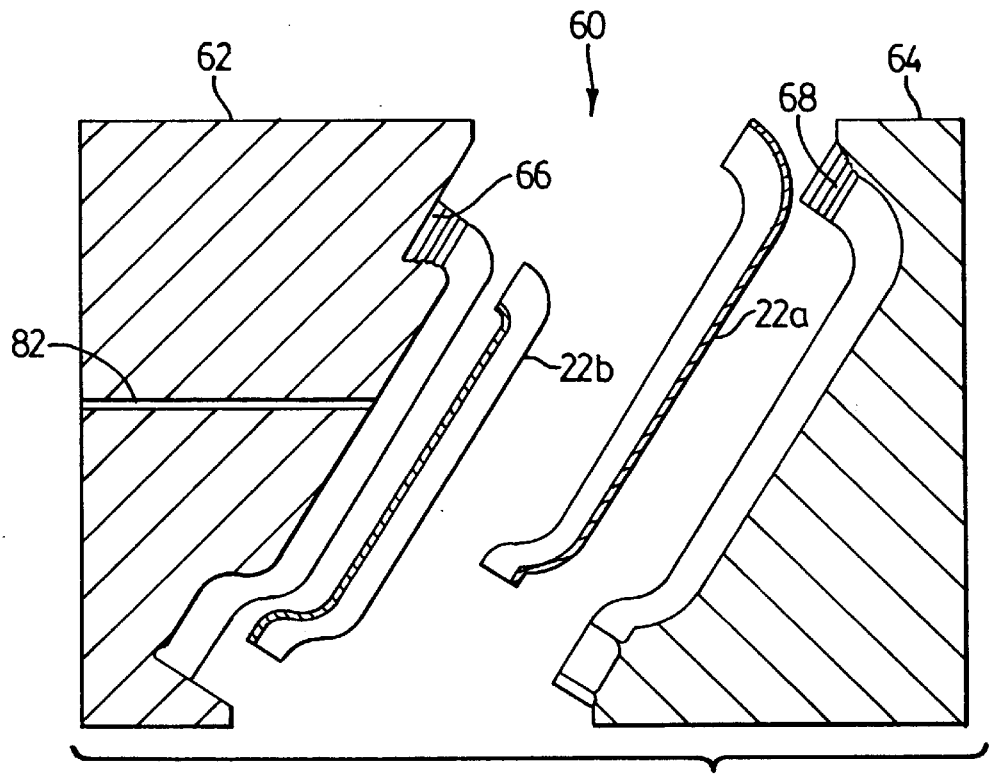
FIGS. 2–5 show a diagrammatic illustration of a method of fabrication of a conduit in accordance with the invention.

Referring to FIG. 2, a typical blow mold is illustrated at 60. Mold 60 comprises partible mold halves 62 and 64. Mold halves 62 and 64 each comprise molding surfaces 66 and 68 respectively.

Figure 3:
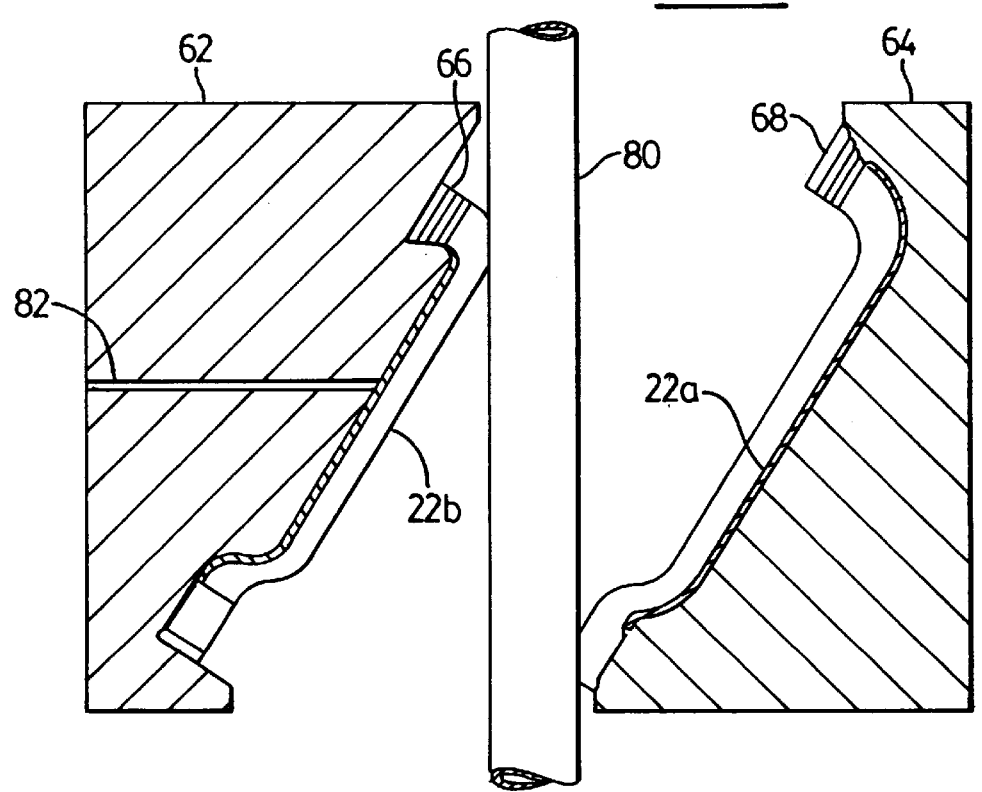

The initial step in the process conveniently involves positioning the collector 22a against the surface 68 as shown in FIGS. 2 and 3. By positioning the collector 22a solely against the molding face 68, a collector 22a which surrounds approximately one half of the conduit 10 is created. If it is desired to provide a collector 22 which completely surrounds the conduit 12 (as shown in FIG. 1) then a second portion 22b of the collector may be positioned against the molding face 66 of mold half 62. While this is shown in FIGS. 2 through 5, it will be understood that it is not necessary that a fully encompassing collector 22 is required. Collector 22 which only partially surrounds the conduit 10 is discussed below. It may be satisfactory depending on the particular design criteria of conduit 12, to use a collector surrounding only a part of the duct in which case, the collector portion 22b will not be required.

As shown in FIG. 3, once the collector 22a and/or 22b is placed against the molding face or faces of the mold 60, a parison 80 of suitable molding material, such as a thermoplastic material, is introduced into the mold 60 between the molding faces 66 and 68. The parison 80 may be in the form of an elongate hollow tube, the desired thickness of the tube wall being controlled by an outlet opening of an extruder device which feeds the parison into the mold (not shown).

Figure 4:
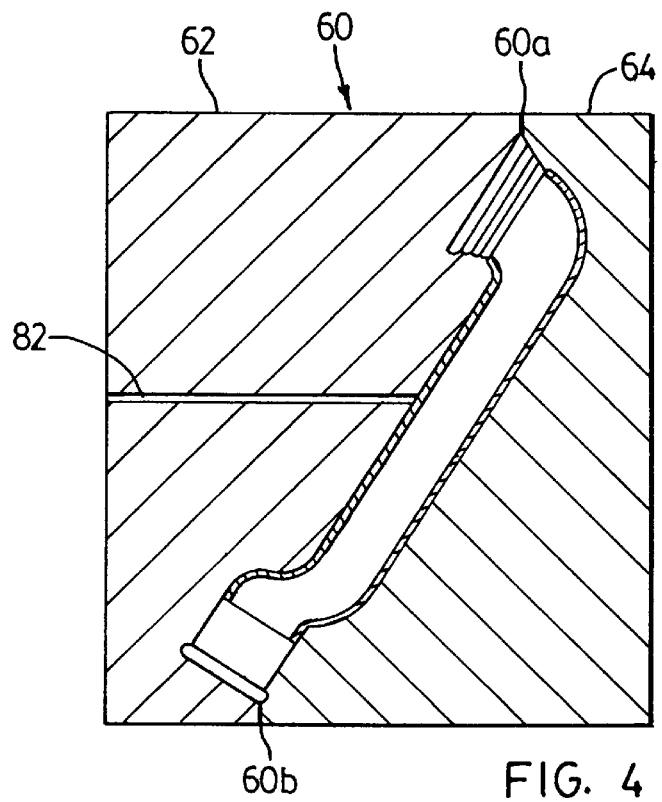
Figure 5:
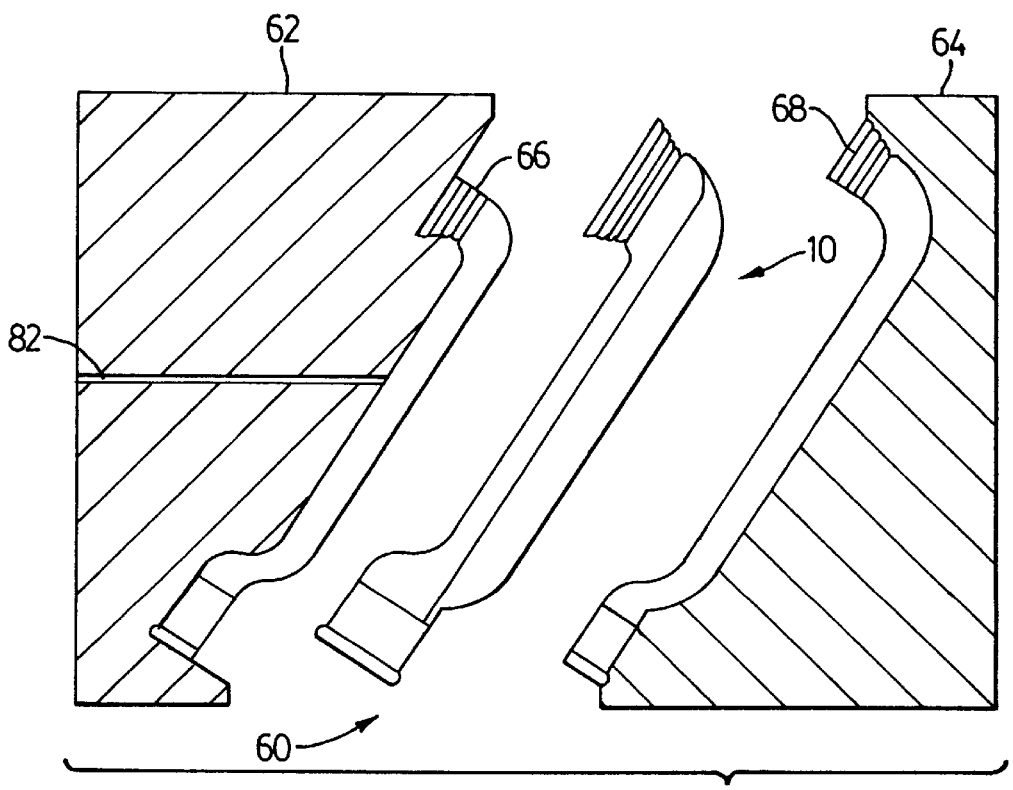

The mold 60 is then closed and top and bottom ends 60A and 60B pinch the parison 80 as shown in FIG. 4. The parison 80 is "blown" in a known manner by introducing air or other desired gas into the hollow centre of the parison 80. The air is injected into the mold 60 and into the parison 80 through one or more openings or needles 82 in the mold. The mold may be cooled using water or other suitable means to maintain the temperature of the mold as desired. The needle 82 may be provided at any convenient spot in the mold 60.

The pressure of the gas introduced through the needle forces the polymer material outwardly toward the molding faces 66 and 68 respectively. The pressure forces the polymer material against the collector 22a (and 22b if desired). The hot parison 80 which is semi-molten, fuses into the surface of the collector 22a and if present, the collector 22b.

After cooling of the polymer material of the parison 80, the mold 60 is opened. The conduit assembly 10 which has been formed in the mold comprises a conduit 12 and has adhered to it, the collector 22 so that the collector 22 and the conduit 12 are a single unitary conduit assembly 10.

In use, conduit assembly 10 is connected at an appropriate place between the cool air supply from an automotive air conditioner and an instrument panel vent outlet. Where an embodiment having a collector 22 which only covers a portion of the exterior surface 16 is used, conduit assembly 10 is positioned such that collector 22 is disposed substantially at the lowermost portion of the assembly so that any condensation occurring on the portion of surface 16 which is not covered by the collector 22 will trickle downward under the effect of gravity to a point where it will be absorbed by collector 22. When the air conditioner is in operation, cool air passes along conduit 12 from inlet 18 to outlet 20. Typically, air emitted from an automotive air conditioner may have a temperature as low as 1° C., and ambient air outside conduit assembly 10 (ie. within the automobile's instrument panel) may be as high as 50° C., particularly during summer operation. This temperature differential, along with typical humidity in the warm air, causes condensation to occur on exterior surface 16. Such condensation moisture is subsequently absorbed by collector 22. Absorbtion of moisture will continue until collector 22 becomes saturated and can hold no additional liquid. Surprisingly, however, such saturation is advantageously forestalled by the evaporative properties of the collector material of the present invention. The flow of warm ambient air passing over collector 22 outside of conduit assembly 10 enhances evaporation of moisture from the outer surface 24 of collector 22. This dynamic evaporation, in conjunction with the superabsorbent nature of the superabsorbent fabric material of the present invention, enables operation of the air conditioner for an increased time period before collector 22 becomes fully saturated and dripping occurs.

As one skilled in the art would expect, the absorbency of collector 22 improves as the thickness of the material used increases. Surprisingly, however, it has been discovered that, because the evaporative qualities of collector 22 decrease with material thickness, there is an optimum thickness for collector 22 for a given collector material composition. It has been found that use of a superabsorbent fabric material made of 60% polyester fibers and 40% FIBERDRI™ fibers at the thickness of 1.0 to about 1.5 mm will remain unsaturated for up to 10 hours under normal operation of an automotive air conditioner at its maximum cooling setting in typical temperature and humidity conditions. The thickness of the superabsorbent fabric material will also have an effect on the amount of condensation moisture that can be retained before dripping occurs. Generally, a thickness of from about 0.5 mm to about 1.5 mm of this material has been found to be particularly advantageous.

Obviously, the length of time before dripping occurs will also depend on the ambient air temperature and humidity outside conduit assembly 10. Testing has shown that a conduit assembly 10, having a collector 22 composed of 60% polyester/40% FIBERDRI™ at a thickness of about 0.5 to about 1.0 mm, conducting 0.4° C. air and operating in 38° C. ambient air at 98% humidity, will not drip moisture for up to 360 minutes. In comparison, an undressed similar conduit will begin to drip moisture in about 10 minutes, and a conduit dressed with the nylon sleeve of the prior art will begin to drip within 60 to 75 minutes. Hence, the collector of the present invention surprisingly offers a marked improvement over the prior art.

As described above, the shape of the conduit assembly 10 may be complex, being dictated in large part by the space limitations within the instrument panel and the distance between the air conditioner delivery outlet and the instrument panel vent outlets. In part because of the complex shape, and the volume of air moved along the conduit, the conduit can be both a source of and a conductor of noise in the automobile interior. Collector 22 of the present invention has the further advantage of providing attenuation of such noise from within conduit 12. This provides for more quiet operation of the air conditioner system, thus providing improved comfort to the occupants of the automobile. The collector material of the present invention is also advantageously substantially nonflammable.

Figure 6:
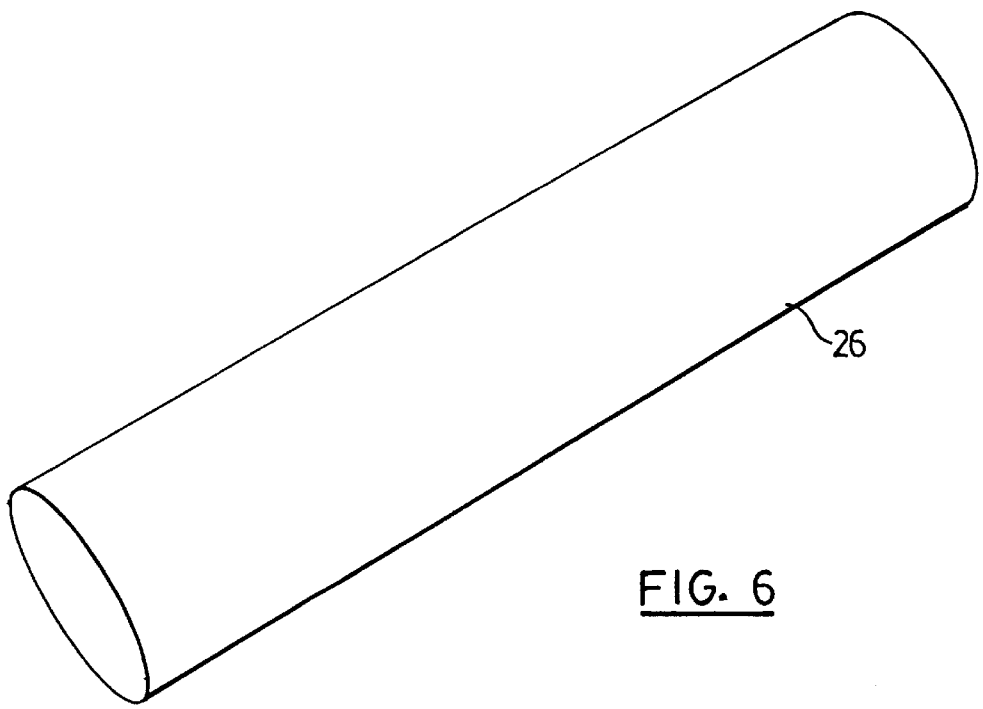
FIG. 6 illustrates a sleeve used in prior art.
Figure 7:
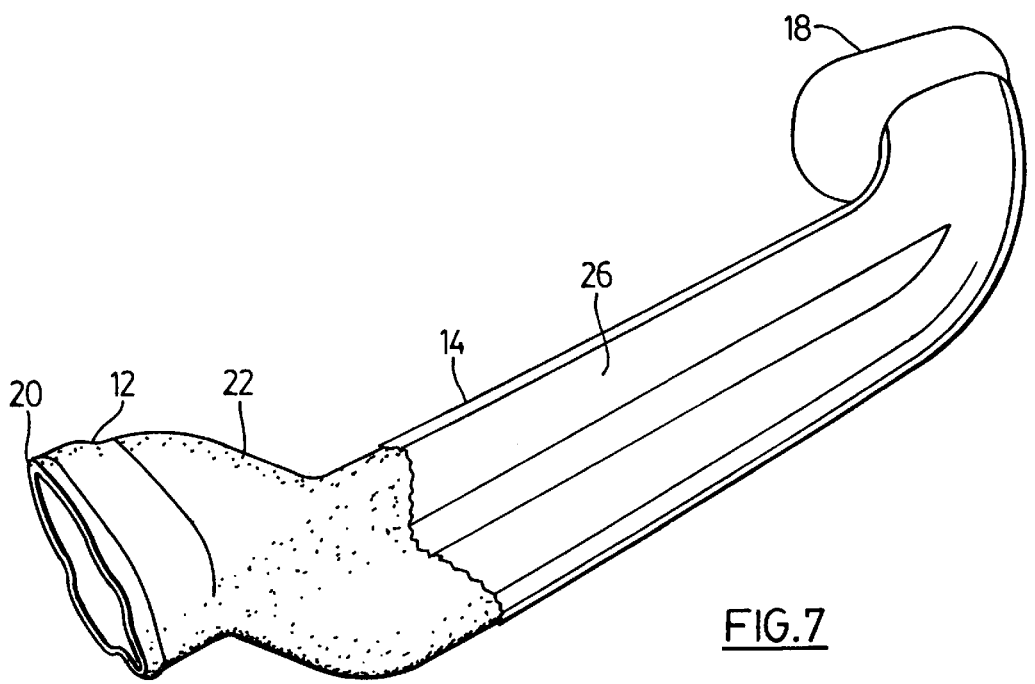
FIG. 7 is a perspective view of an alternate embodiment of the conduit of the present invention with a portion thereof broken away for illustration purposes.

In the embodiment illustrated in FIG. 1 the collector 22 of super-absorbent fabric material is adhered to substantially the entire exterior surface of the conduit 12. In an alternate embodiment the conduit assembly 10 has a collector 22 and, in addition, a sleeve 26 of the type used in the prior art. Such a sleeve 26 is shown in FIG. 6. The sleeve 26 may be made from polypropylene, the same material as the conduit 12, or other extensible material. As shown in FIG. 7, this sleeve completely covers the exterior surface of the duct 14 thereby enclosing the collector 22. This sleeve 26 when used may serve several purposes. Firstly, the sleeve assists in securing the collector 22 to the conduit 12. This is particulary advantageous when the collector is glued to the conduit 12. Secondly, the sleeve helps to support the composite material of the collector 22. As the material becomes saturated, there will be a significant quantity of water in the collector at the lowermost portions. This weight of water may tend to cause separation of the layers of the composite material. The sleeve assists in supporting the composite material to minimize separation which might otherwise occur in extreme conditions.

Figure 8:
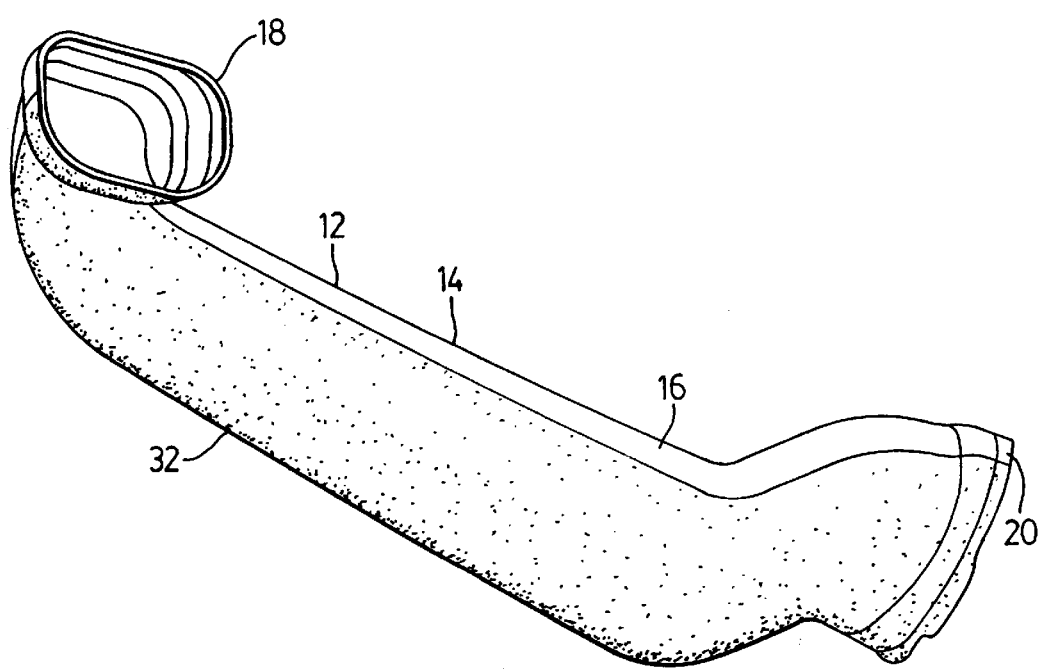
FIG. 8 is a perspective view from below and behind of another alternate embodiment of the conduit of the present invention.

In a further embodiment illustrated in FIG. 8, a collector 32 is manufactured from similar composite material as collector 20 referred to above. However, in this case the collector 32 does not cover substantially the whole of the surface of the conduit 12. Rather the collector 32 is adhered to substantially less than the entire exterior surface of the conduit 12. Particularly where the conduit assembly 10 is manufactured in a blow molding procedure, as shown in FIGS. 2 through 5, there may be two mold halves which are responsible for respectively contouring approximately 50% of the surface area of the conduit 12. The collector 32 may be positioned in one of the mold halves so that the collector 32 can be adhered to up to approximately 50% of the surface area of the conduit 12. As shown in FIG. 8, the collector 32 is adhered to what will be the lower portion of the conduit 12 when it is installed on the vehicle. Thus, gravity drains the condensation moisture toward the collector 32.

In an alternate embodiment (FIG. 9) the conduit assembly 40 includes a collector 32 and also a sleeve 26 which is applied to the conduit 12 over top of the collector 32. This sleeve 26 can extend around not only the collector 32 but the remainder of the exterior surface of the conduit 12 not covered by the collector 32. Again in this embodiment, the sleeve serves the above functions of additionally securing the collector 32 to the conduit 12, and supporting the collector 32. In addition, the sleeve 26 collects condensation moisture from the upper surface of the duct 14 and serves a wicking function to deliver the water to the collector 32.

Advantageously the collector 32 is adhered to at least 30% of the surface area of what, in use, is the bottom half of the conduit assembly 10.

This may be increased up to 100% of what in use is the bottom half of the conduit assembly 10 by having a collector 32 adhered to substantially the entire lower half of the surface of the conduit 12.

Figure 9:
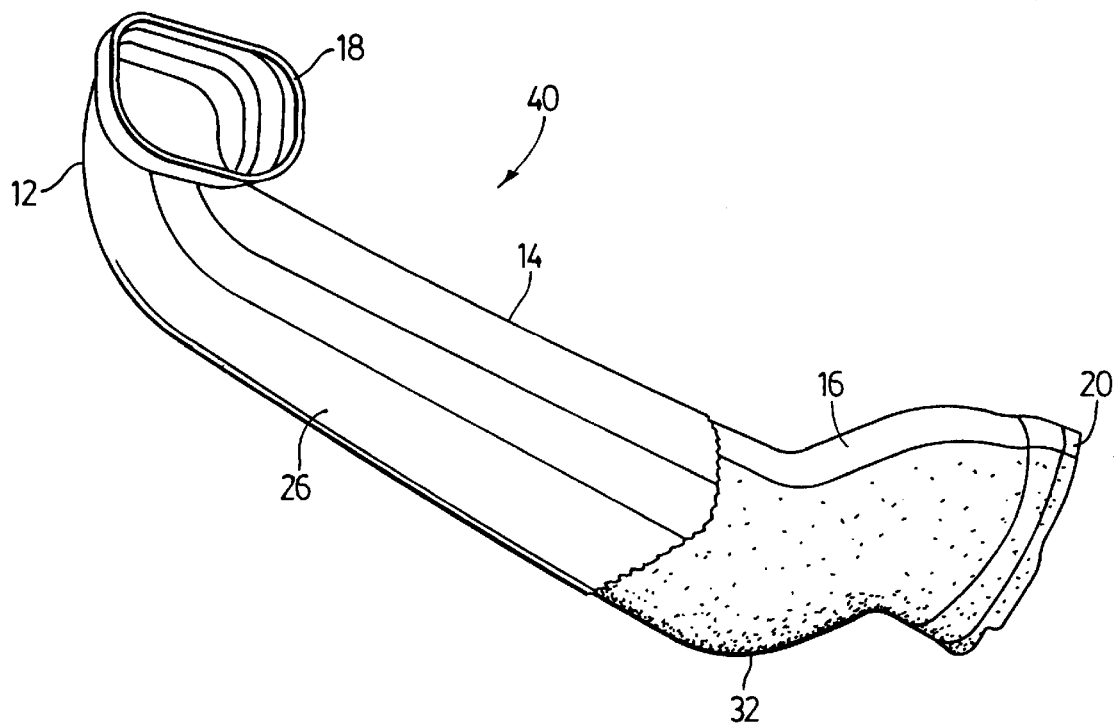
FIG. 9 is a view similar to FIG. 8 of another alternate embodiment of the invention, with a portion thereof broken away.

In FIG. 9, the embodiment illustrated therein has a collector 32 which is adhered to substantially all of the bottom "half" of the conduit 12. This means effectively that the amount of superabsorbent fabric material used in the embodiment of FIG. 9 as compared to the amount of material used in the embodiment shown in FIG. 1 is reduced by one-half. Tests, however, have shown that the dripping time under otherwise similar operating conditions is not reduced to one-half.

In a test using the embodiment of FIG. 1, in which all of the surface area of conduit 12 was covered by a collector 22 but without a sleeve, dripping occurred in approximately 300 minutes. Using an identical conduit assembly 10 but with only the bottom one-half of the conduit 12 covered by a collector 32 of the same material (FIG. 8), the dripping time was reduced to 150 minutes. However, in a similar conduit assembly 40 with the collector 32 covering only the bottom half of the conduit 12 but with a sleeve of polypropylene covering substantially the entire surface area (FIG. 9) the dripping time was only reduced to 240 minutes. This shows that even though there is a reduction of 50% of the superabsorbent fabric material as compared to the device of FIG. 1 the performance has been reduced only by 60 minutes, that is to say, 20%. Thus, the use of a polypropylene sleeve which is particularly cheaper than the superabsorbent material made using FHBERDRI™ fibers or other SAF materials, permits a good performance to be achieved at reduced cost as compared to the assembly shown in FIG. 1.

The surprising effectiveness of the present invention is illustrated in FIG. 10 which is a bar chart showing experimental results achieved with a particular shaped conduit 12. The same shape conduit 12 was used for all cases but each test involves a different conduit assembly. In each case there is a different collector as compared to test 1 which tests the conduit without a collector or a test of different conduit material. The conditions for each test are set out in FIG. 11 in table form.

Figure 11:
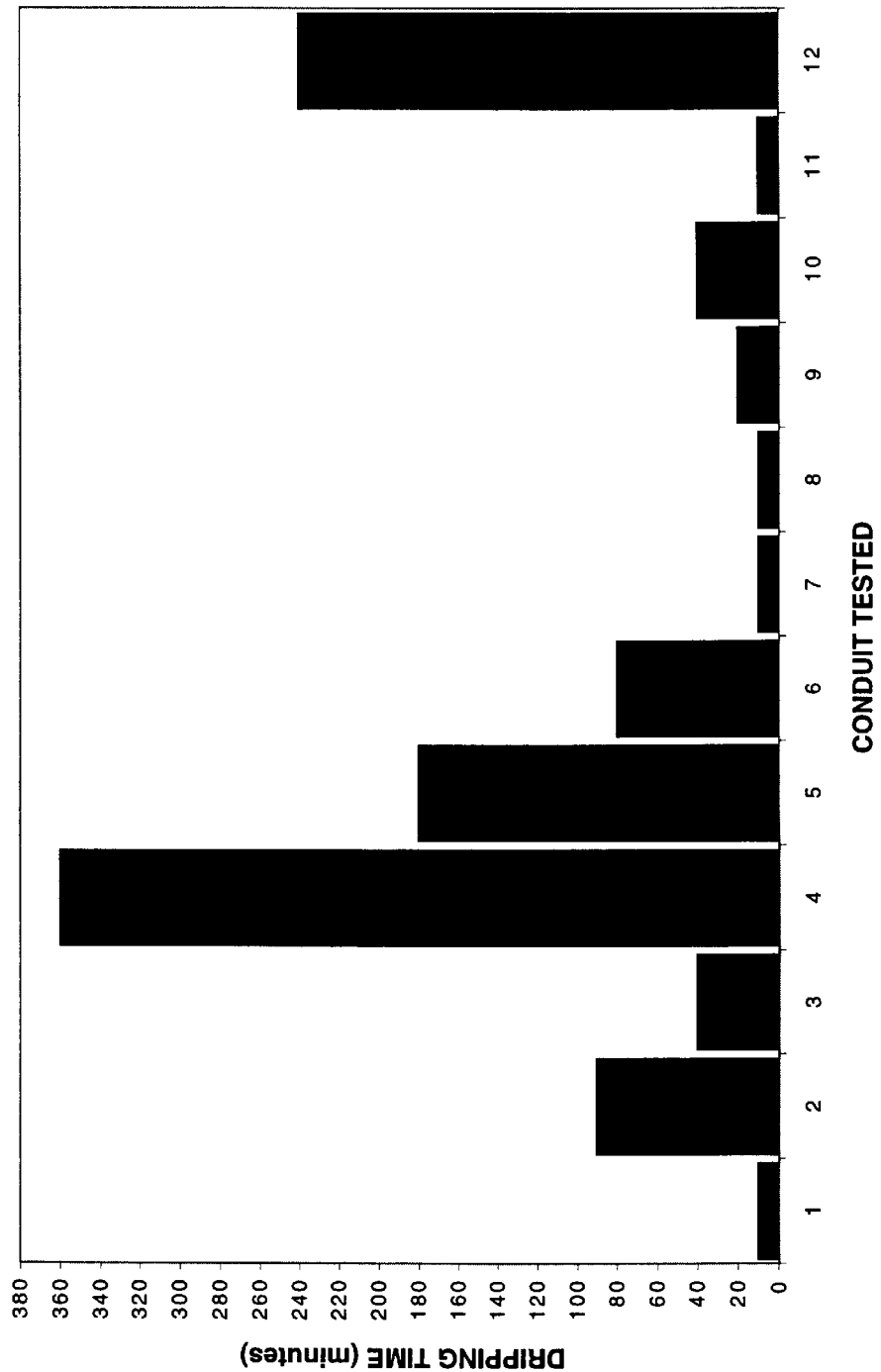
FIG. 11 is a table setting out the test conditions for the test of FIG. 10.

The horizontal axis of the bar chart of FIG. 10 identifies tests 1 through 12. The bar chart shows the time in which dripping occurs on the left hand vertical axis. In FIG. 11 the left hand column identifies the tests 1 through 12. The second column of FIG. 11 identifies the polymer material of the conduit as well as the sleeve material and proportion.

In test number 1, the basic conduit was tested. Dripping occurred in 8 to 12 minutes.

In test number 2, the conduit was equipped with the polypropylene sleeve of the prior art. This improved the time to dripping to between 55 and 90 minutes.

Test number 3 involved the same conduit with a half encompassing sleeve made of polypropylene but no superabsorbent material fabric. In this case the dripping time was 30 to 40 minutes.

Test number 4 involves the same conduit but covered with a full covering collector in accordance with this invention. This is a test of the embodiment as shown in FIG. 1. In this test, the drip time was between 300 and 360 minutes. The bar chart for test number 4 clearly shows the superiority of this structure over any other structure tested.

Test number 5 is similar to test number 4 except that a half covering collector in accordance with the invention was used. This is similar to the device as illustrated in FIG. 8. With this assembly, the dripping time was from 160 to 180 minutes.

Test number 6 involves a conduit with a half sleeve of nylon. Dripping time was 60 to 75 minutes.

Test number 7 involves a conduit manufactured by TPO rather than polypropylene. The test is similar to test number 1. With no collector, the conduit had a dripping time of from 8 to 10 minutes.

Test number 8 is similar to test number 1 but using a foamed TPO conduit. The foamed TPO conduit without a collector has a dripping time of 10 to 11 minutes.

A low density polyethylene conduit without collector has a dripping time of 20 to 25 minutes as shown in test 9.

A foam low density polyethylene conduit without collector has a dripping time of 35 to 40 minutes as shown in test number 10.

A foam polypropylene conduit without collector has a dripping time of 7 to 9 minutes.

Test number 12 was conducted using a polypropylene conduit covered with a one half covering collector in accordance with this invention and a nylon sleeve. This is a test of the embodiment shown in FIG. 9. The dripping time for this type of conduit assembly is about 220 to 240 minutes.

Review of the bar chart of FIG. 10 shows that the greatest dripping time is achieved by using a full layer of composite material in accordance with this invention and as shown in test number 4. Test number 12 shows that by reducing the amount of composite material by 50% but adding a nylon sleeve provides a dripping time of 260 minutes as opposed to 360 minutes for the full collector of the type illustrated in FIG. 1.

While the above description constitutes the preferred embodiment, it will be appreciated that the present invention is susceptible to modification and change without departing from the fair meaning of the proper scope of the accompanying claims.

I claim:

1. A gas conducting automotive air conditioning conduit for use in an automobile air conditioning system:

said conduit having an exterior surface; and a superabsorbent fabric material containing superabsorbent fibres wherein said superabsorbent fabric material is positioned adjacent said exterior surface for collecting condensation moisture forming on said exterior surface of said conduit when cooled air is passed along said conduit and wherein said superabsorbent fabric comprises at least about 40% superabsorbent fibres and said superabsorbent fibres are capable of absorbing at least ten times their own weight of water.

2. The conduit of claim 1 wherein said superabsorbent fabric material substantially covers said exterior surface of said conduit.

3. The conduit of claim 1 wherein a first portion of said exterior surface of said conduit is not covered by said superabsorbent fabric material and said superabsorbent fabric material covers a second portion of said conduit.

4. The conduit of claim 3 wherein said second portion of said conduit is the lower half of said conduit when said conduit is installed in said automobile.

5. The conduit of claim 4 wherein an extensible sleeve is disposed around said first and second portions of said conduit.

6. The conduit of claim 1 wherein said superabsorbent fabric material is capable of absorbing at least 40 grams of water per gram of said material.

7. The conduit of claim 1 wherein said superabsorbent fabric material is an olefin/alkyl carboxylate copolymer.

8. The conduit of claim 1 wherein said superabsorbent fabric material is adhered to said exterior surface of said conduit.

9. The conduit of claim 8 wherein said superabsorbent fabric material is integrally adhered to said exterior surface of said conduit.

10. The conduit of claim 1 wherein an extensible sleeve is disposed around said exterior surface of said conduit and said superabsorbent fabric material.

11. The conduit of claim 10 wherein said superabsorbent fabric material is held adjacent said exterior surface of said conduit by said sleeve.

12. The conduit of claim 1 wherein said superabsorbent fabric material has thickness of from about 1 mm to 1.5 mm.

* * * * *